(12) United States Patent
Kim

(10) Patent No.: US 10,573,854 B2
(45) Date of Patent: Feb. 25, 2020

(54) BATTERY PACK

(71) Applicant: SAMSUNG SDI CO., LTD., Yongin-si, Gyeonggi-do (KR)

(72) Inventor: Hyunchul Kim, Yongin-si (KR)

(73) Assignee: SAMSUNG SDI CO., LTD., Yongin-si, Gyeonggi-do (KR)

( * ) Notice: Subject to any disclaimer, the term of this patent is extended or adjusted under 35 U.S.C. 154(b) by 598 days.

(21) Appl. No.: 14/952,384

(22) Filed: Nov. 25, 2015

(65) Prior Publication Data

US 2016/0380243 A1 Dec. 29, 2016

(30) Foreign Application Priority Data

Jun. 29, 2015 (KR) .................. 10-2015-0092170

(51) Int. Cl.
*H01M 2/02* (2006.01)
*H01M 2/30* (2006.01)
*H01M 2/26* (2006.01)

(52) U.S. Cl.
CPC ....... *H01M 2/0242* (2013.01); *H01M 2/0287* (2013.01); *H01M 2/26* (2013.01); *H01M 2/30* (2013.01)

(58) Field of Classification Search
CPC ............ H01M 2/0242; H01M 2/0287; H01M 2/0277; H01M 2/0285; H01M 2/0473; H01M 2/0482; H01M 2/0486
See application file for complete search history.

(56) References Cited

U.S. PATENT DOCUMENTS

| | | | | |
|---|---|---|---|---|
| 1,545,328 A | * | 7/1925 | Holland | H01M 2/0242 156/252 |
| 6,784,636 B1 | * | 8/2004 | Partington | H01M 2/0242 320/107 |
| 2003/0064283 A1 | | 4/2003 | Uemoto et al. | |
| 2006/0166087 A1 | * | 7/2006 | Ogata | H01M 2/0242 429/153 |
| 2010/0216004 A1 | | 8/2010 | Yoon | |
| 2011/0008670 A1 | | 1/2011 | Han et al. | |
| 2013/0224566 A1 | * | 8/2013 | Sakai | H01M 2/0252 429/158 |

FOREIGN PATENT DOCUMENTS

| | | |
|---|---|---|
| EP | 2 557 609 A1 | 2/2013 |
| EP | 2 624 356 A1 | 8/2013 |
| EP | 2 811 571 A1 | 12/2014 |
| JP | 2003-109655 A | 4/2003 |
| KR | 2010-0096994 A | 9/2010 |
| KR | 2011-0005595 A | 1/2011 |
| WO | WO02058216 * | 7/2002 |

OTHER PUBLICATIONS

Extended European Search Report dated Sep. 30, 2016 in Corresponding European Patent Application No. 16173434.8.

* cited by examiner

*Primary Examiner* — Ula C Ruddock
*Assistant Examiner* — Thomas H. Parsons
(74) *Attorney, Agent, or Firm* — Lee IP Law, PC

(57) ABSTRACT

A battery pack including a plurality of electrode assemblies, a lower case including a plurality of cell compartments accommodating the plurality of electrode assemblies, and an upper case on the lower case at a top opening of the lower case, wherein each of the upper case and the lower case is includes a metal layer interposed between an internal layer and an external layer, the internal layer and the external layer being made of a plastic material.

9 Claims, 5 Drawing Sheets

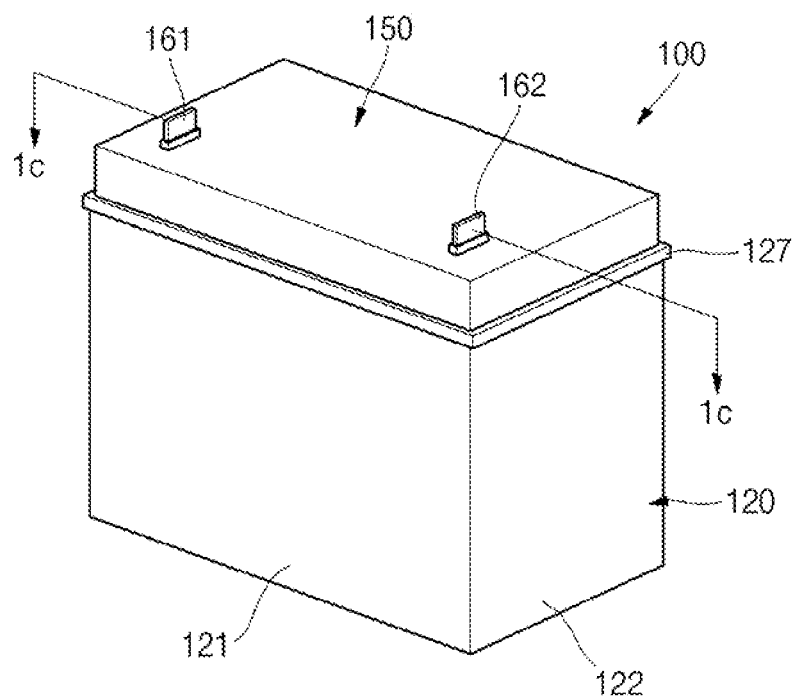

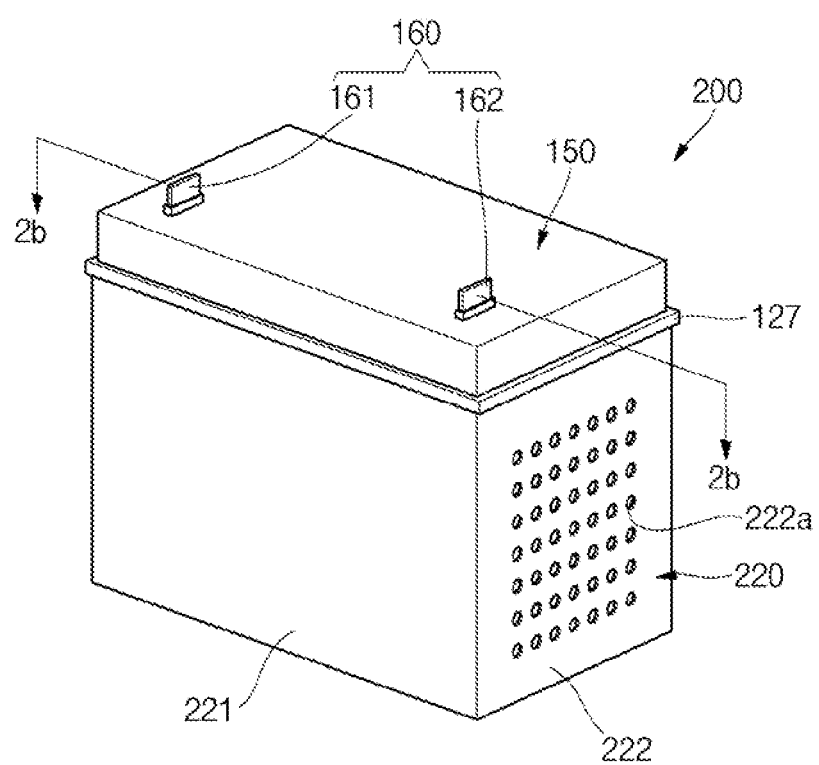

BATTERY PACK

CROSS-REFERENCE TO RELATED APPLICATION

Korean Patent Application No. 10-2015-0092170, filed on Jun. 29, 2015, in the Korean Intellectual Property Office, and entitled: "Battery Pack," is incorporated by reference herein in its entirety.

BACKGROUND

1. Field

Embodiments relate to a battery pack.

2. Description of the Related Art

In general, a multiple series/parallel battery pack may be manufactured by connecting a plurality of secondary batteries (each including an electrode assembly) in series and in parallel. For example, the multiple series/parallel battery pack may be manufactured by sealing an electrode assembly in a can of a secondary battery and accommodating a plurality of secondary batteries in a case to then be electrically connected.

SUMMARY

Embodiments are directed to a battery pack.

The embodiments may be realized by providing a battery pack including a plurality of electrode assemblies, a lower case including a plurality of cell compartments accommodating the plurality of electrode assemblies, and an upper case on the lower case at a top opening of the lower case, wherein each of the upper case and the lower case is includes a metal layer interposed between an internal layer and an external layer, the internal layer and the external layer being made of a plastic material.

The lower case may include a plurality of barriers separating an internal space of the lower case into the plurality of cell compartments.

The barriers may be made of a same material as the internal layer.

The battery pack may further include an electrolyte in the plurality of cell compartments of the lower case.

The battery pack may further include a top plate sealing the top opening of the lower case, and a plurality of connection tabs electrically connecting electrode tabs of adjacent electrode assemblies, the electrode tabs passing through the top plate.

The lower case may further include a stepped portion outwardly bent at a top end thereof, and an extending portion upwardly extending from the stepped portion.

The top plate may be placed on a top surface of the stepped portion of the lower case and then sealed with the lower case.

The extending portion of the lower case may surround a bottom portion of the upper case and may be coupled with the upper case.

The battery pack may further include electrode terminals, the electrode terminals being exposed outside of the battery pack, passing through the upper case, and being electrically connected to the plurality of electrode assemblies, wherein the electrode terminals are electrically separated from the metal layer of the upper case.

The lower case may include a plurality of holes in the external layer thereof, the plurality of holes partially exposing the metal layer at an outside of the battery pack.

BRIEF DESCRIPTION OF THE DRAWINGS

Features will be apparent to those of skill in the art by describing in detail exemplary embodiments with reference to the attached drawings in which:

FIGS. 1A, 1B, and 1C illustrate a perspective view, an exploded perspective view, and a cross-sectional view of a battery pack according to an embodiment; and FIGS. 2A and 2B illustrate a perspective view and a cross-sectional view of a battery pack according to another embodiment.

DETAILED DESCRIPTION

Figure 1B:
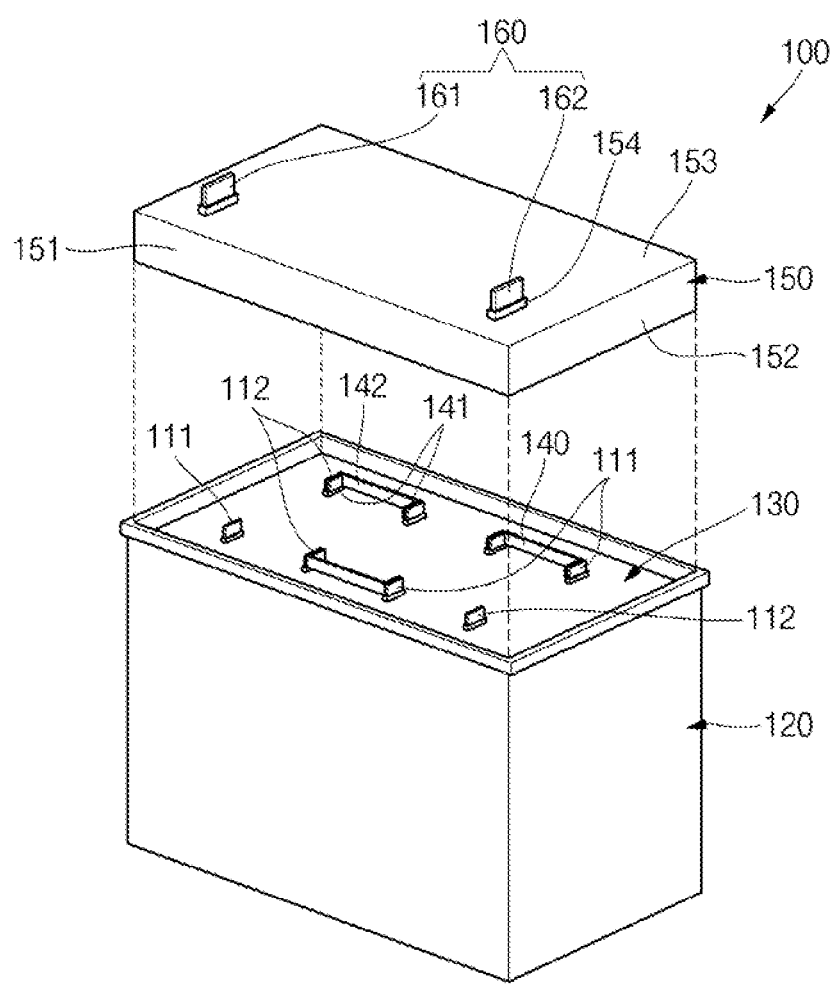

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art.

In the drawing figures, the dimensions of layers and regions may be exaggerated for clarity of illustration. It will also be understood that when a layer or element is referred to as being "on" another layer or element, it can be directly on the other layer or element, or intervening elements may also be present. In addition, it will also be understood that when an element is referred to as being "between" two elements, it can be the only element between the two elements, or one or more intervening elements may also be present. Like reference numerals refer to like elements throughout.

As used herein, the term "and/or" includes any and all combinations of one or more of the associated listed items.

As used herein, the singular forms are intended to include the plural forms as well, unless the context clearly indicates otherwise. It will be further understood that variations of the terms "comprise," "include," and/or "comprising," when used in this specification, specify the presence of stated features, integers, steps, operations, elements, and/or components, but do not preclude the presence or addition of one or more other features, integers, steps, operations, elements, components, and/or groups thereof.

It will be understood that, although the terms first, second, etc. may be used herein to describe various members, elements, regions, layers and/or parts, these members, elements, regions, layers and/or parts should not be limited by these terms. These terms are only used to distinguish one member, element, region, layer and/or part from another member, element, region, layer and/or part. Thus, for example, a first member, element, region, layer and/or part discussed below could be termed a second member, element, region, layer and/or part.

Figure 1C:
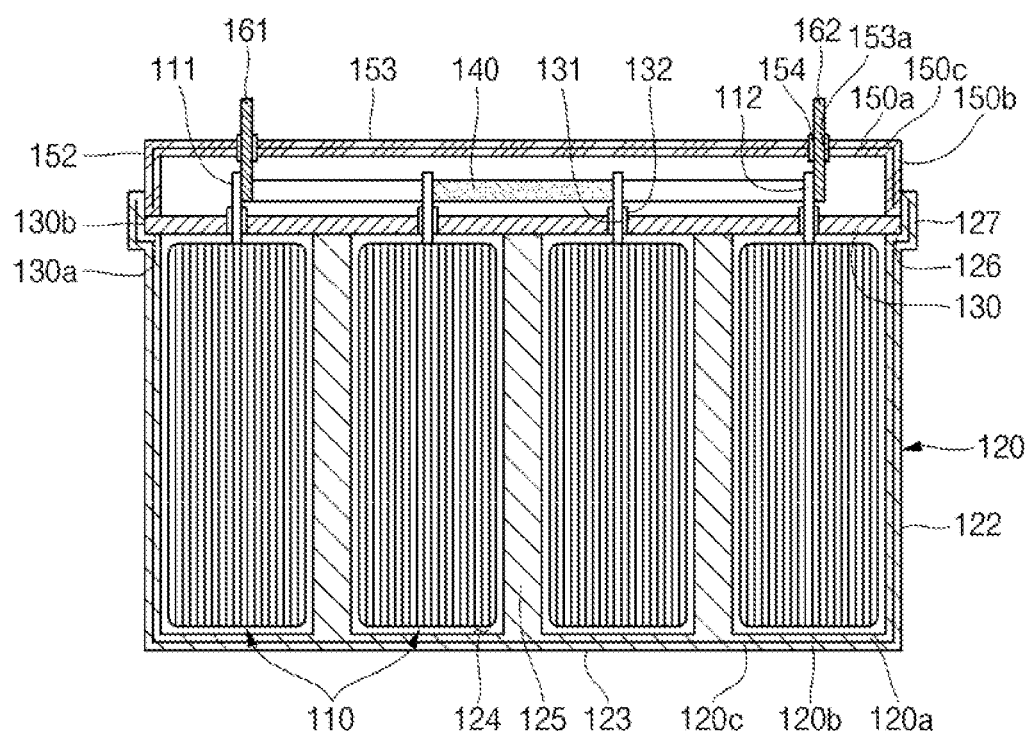

Referring to FIG. 1A, a perspective view of a battery pack according to an embodiment is illustrated. Referring to FIG. 1B, an exploded perspective view of the battery pack of FIG. 1A is illustrated. Referring to FIG. 1C, a cross-sectional view of the battery pack of FIG. 1A, taken along the line 1c-1c, is illustrated.

As illustrated in FIGS. 1A to 1C, the battery pack 100 may include a plurality of electrode assemblies 110, a lower case 120 accommodating the plurality of electrode assemblies 110, a top plate 130 sealing a top opening of the lower case 120, a plurality of connection tabs 140 on a top surface of the top plate 130 and electrically connecting the plurality of electrode assemblies 110, an upper case 150 combined or coupled with the lower case 120, and electrode terminals 160 exposed to the outside and passing through the upper case 150.

Each of the plurality of electrode assemblies 110 may be formed by winding or laminating a stacked structure including a positive electrode plate, a negative electrode plate, and a separator as an insulator interposed between the positive electrode plate and the negative electrode plate. In each of the electrode assemblies 110, a positive electrode tab 111 electrically connected to the positive electrode plate and a negative electrode tab 112 electrically connected to the negative electrode plate may protrude at one surface of the electrode assembly 110. When the surface of the electrode assembly 110, at which the positive electrode plate and the negative electrode plate protrude, is referred to a top surface, the plurality of electrode assemblies 110 may be arranged in the lower case 120 such that long side surfaces of adjacent ones of the plurality of electrode assemblies 110 are parallel with each other. Here, barriers 125 of the lower case 120 may be interposed between the long side surfaces of the adjacent electrode assemblies 110. For example, the plurality of electrode assemblies 110 may be accommodated in a plurality of cell compartments 124 such that the long side surfaces of the adjacent electrode assemblies 110 face each other with respect to or on opposite sides of the barriers 125.

In addition, the positive and negative electrode tabs 111 and 112 of the electrode assemblies 110 may be alternately arranged such that the positive and negative electrode tabs 111 and 112 of the adjacent electrode assemblies 110 alternate each other, thereby forming an array of electrode tabs. For example, the array of electrode tabs may be a line formed when the electrode tabs having alternating polarities are arranged in a row. For example, when the electrode assemblies 110 are accommodated in the lower case 120, an array of two electrode tabs may be formed.

In an implementation, the positive and negative electrode tabs 111 and 112 may be formed from electrode uncoated portions of the positive and negative electrode plates without using separate members.

The plurality of electrode assemblies 110 may be accommodated in the plurality of cell compartments 124 provided in the lower case 120. Here, the plurality of electrode assemblies 110 may be accommodated in the plurality of cell compartments 124 together with an electrolyte.

The lower case 120 may have a substantially hexahedral or cuboid shape having a top opening to receive the plurality of electrode assemblies 110. For example, the lower case 120 may have two long side surfaces 121 facing each other, two short long side surfaces 122 connecting opposite ends of the two long side surfaces 121, and a rectangular bottom surface 123 connecting bottom sides of the two long side surfaces 121 and the two short side surfaces 122. The two long side surfaces 121, the two short side surfaces 122, and the bottom surface 123 of the lower case 120 may be integrally formed.

A metal layer 120c may be interposed between an internal layer 120a and an external layer 120b of the lower case 120. The internal layer 120a and the external layer 120b may be made of, e.g., a plastic material. For example, each of the two long side surfaces 121, the two short side surfaces 122, and the bottom surface 123 of the lower case 120 may be a composite layer having the metal layer 120c interposed between the internal layer 120a and the external layer 120b. For example, the battery pack may have a rigid structure and may not be a pouch-type battery.

The internal layer 120a may form an internal surface of the lower case 120. The internal layer 120a may be positioned at an interior side of the lower case 120 and may be formed using, e.g., a plastic material having chemical resistance against the electrolyte, high ductility, low reactivity to swelling, and a high insulating property. In an implementation, the internal layer 120a may be made of or include, e.g., polypropylene (PP), polyethylene (PE), or the like.

The external layer 120b may form an external surface of the lower case 120. The external layer 120b may be positioned at an exterior side of the lower case 120 and may be formed using, e.g., a plastic material having high scratch resistance and abrasion resistance for the purpose of preventing the lower case 120 from being abraded by external factors or conditions. In an implementation, the external layer 120b may be made of or may include, e.g., polyphenylene sulfide (PPS), modified phenylene ether, polyurethane, polycarbonate, polypropylene (PP), or the like.

The metal layer 120c may be interposed between the external layer 120b and the internal layer 120a. The metal layer 120c may be formed by, e.g., depositing a metal in a thin film type through chemical vapor deposition (CVD), physical vapor deposition (PVD), or atomic layer deposition (ALD), spraying a metal in a gel type, or injecting or placing a metal foil or sheet as multiple layers. The metal layer 120c may help improve strength of the lower case 120 by supporting the internal layer 120a and the external layer 120b of the lower case 120, and may help prevent moisture or gases from moving around, e.g., into or out of the battery pack.

The internal layer 120a and the external layer 120b of the lower case 120 may be formed using a plastic material, thereby achieving a lighter weight and a configurational freedom of the lower case 120. In addition, the lower case 120 may have reinforced strength by including the metal layer 120c between the plastic internal layer 120a and the plastic external layer 120b.

The lower case 120 may be formed by forming the metal layer 120c on an internal surface of the external layer 120b and then forming the internal layer 120a so as to entirely cover the internal surface of the external layer 120b. In an implementation, the external layer 120b and the internal layer 120a may be formed by, e.g., injection molding. The lower case 120 may be configured such that the metal layer 120c is not exposed at a top end thereof, and the top end may be covered by the external layer 120b.

In addition, the lower case 120 may include the plurality of cell compartments 124 for accommodating the plurality of electrode assemblies 110. For example, the lower case 120 may include a plurality of barriers 125 separating the internal space of the lower case 120 into the individual cell compartments 124. The barriers 125 may be provided in plural so as to be parallel with the short side surfaces 122 of the lower case 120. The electrode assemblies 110 and an electrolyte may be accommodated in the cell compartments 124. Like the internal layer 120a, the barriers 125 may be made of or include, e.g., a plastic material having high chemical resistance to the electrolyte and a high insulating property. In an implementation, three barriers 125 with four cell compartments 124 may be included, as illustrated in FIG. 1C, or other numbers of barriers 125 and cell compartments 124 may be included according to the number of electrode assemblies 110 accommodated in the lower case 120.

The lower case 120 may further include a stepped portion 126 outwardly bent at a top end thereof. The lower case 120 may also further include an extending portion 127 upwardly extending from an end of the stepped portion 126. For example, each of the two long side surfaces 121 and the two short side surfaces 122 of the lower case 120 may include the stepped portion 126 having a top end outwardly bent and extending, and the extending portion 127 upwardly extending from the end of the stepped portion 126. The stepped portion 126 may be a region on which the top plate 130 is placed. In addition, the extending portion 127 may be a region that surrounds a bottom end of the upper case 150.

The top plate 130 may have a substantially plate-like shape and may seal the top opening of the lower case 120. The top plate 130 may be placed on the stepped portion 126 of the lower case 120 and may then be sealed or coupled with the lower case 120 using, e.g., a sealant or a gasket. For example, the top plate 130 may be coupled with the lower case 120 at one or more of a contact surface between a lateral surface 130b of the top plate 130 and the extending portion 127 of the lower case 120 and a contact surface between a bottom-surface outer circumference 130a of the top plate 130 and the stepped portion 126 of the lower case 120. The bottom surface of the top plate 130 may be brought into contact with or closely adhered to top surfaces of the barriers 125.

The top plate 130 may be made of an insulating material and may include a plurality of tab holes 131 to be coupled with the electrode tabs 111 and 112 of the plurality of electrode assemblies 110. For example, the electrode tabs 111 and 112 of the plurality of electrode assemblies 110 may upwardly protrude a predetermined length while passing through the tab holes 131 of the top plate 130. In an implementation, the top plate 130 may include a seal gasket 132 to seal the tab hole 131 as the electrode tabs 111 and 112 pass therethrough. For example, the seal gasket 132 may help reduce the possibility of and/or prevent external moisture or contaminants from penetrating into the lower case 120 and/or may help reduce the possibility of and/or prevent the electrolyte in the cell compartments 124 from flowing out.

The connection tabs 140 may electrically connect positive electrode tabs 111 of adjacent ones among the plurality of electrode assemblies 110 (upwardly protruding from the top plate 130) and negative electrode tabs 112 of the adjacent electrode assemblies 110 arranged on the same array of the electrode tabs. In addition, the connection tabs 140 may electrically connect negative electrode tabs 112 of the plurality of electrode assemblies 110 and positive electrode tabs 111 of the adjacent electrode assemblies 110 arranged on the same array of electrode tabs. The connection tabs 140 may include two tab connection parts 141 connected to the electrode tabs 111 and 112 of the electrode assemblies 110 and a connecting portion 142 connecting the two tab connection parts 141. One surface of each of the tab connection parts 141 may be brought into contact with and welded to the positive electrode tabs 111 or the negative electrode tabs 112 of the electrode assemblies 110. The connecting portion 142 may be bent from ends of two tab connection parts 141 and may connect the two tab connection parts 141. The plurality of connection tabs 140 may connect the plurality of electrode assemblies 110 in series with each other. In an implementation, the connection tabs 140 may also connect the plurality of electrode assemblies 110 in parallel with each other according to the accommodating type of the electrode assemblies 110. The connection tabs 140 may also connect the plurality of electrode assemblies 110 in series and in parallel with each other. The connection tabs 140 may directly electrically connect the plurality of electrode assemblies 110 without using separate connection members, and contact resistance between the individual electrode assemblies 110 may be minimized.

The upper case 150 may be assembled and sealed or coupled with the top end of the lower case 120 so as to cover the top opening of the lower case 120. The upper case 150 may help protect the positive and negative electrode tabs 111 and 112 of the electrode assemblies 110 (upwardly exposed or protruding from the top plate 130) from external surroundings. The upper case 150 may have a substantially hexahedral or cuboid shape having an open bottom end. For example, the upper case 150 may have two long side surfaces 151 facing each other, two short long side surfaces 152 connecting opposite ends of the two long side surfaces 151, and a rectangular top surface 153 connecting (e.g., bottom or top) sides of the two long side surfaces 151 and the two short side surfaces 152. The two long side surfaces 151, the two short side surfaces 152, and the bottom surface 153 of the upper case 150 may be integrally formed. A bottom end of the upper case 150 may be inserted into or within the extending portion 127 of the lower case 120 to be brought into contact with the top plate 130. An external surface of the bottom end of the upper case 150 may be welded to or closely adhered and sealed or coupled with the internal surface of the top end of the lower case 120 using, e.g., a sealant or a gasket.

The upper case 150 may include two terminal holes 153a on a top surface 153 thereof to be coupled with a positive electrode terminal 161 (electrically connected to one of the positive electrode tabs 111) and a negative electrode terminal 162 (electrically connected to one of the negative electrode tabs 112). The positive electrode terminal 161 and the negative electrode terminal 162 may be upwardly exposed and protruded from the upper case 150 and may pass through the terminal holes 153a of the upper case 150. In an implementation, a gasket 154 may be included to seal regions between the positive electrode terminal 161 and the upper case 150 and between the negative electrode terminal 162 and the upper case 150. For example, the gasket 154 may help reduce the possibility of and/or prevent external moisture or other contaminants from penetrating into the upper case 150.

A metal layer 150c may be interposed between an internal layer 150a and an external layer 150b of the upper case 150. The internal layer 150a and the external layer 150b may be made of a plastic material. For example, each of the two long side surfaces 151, the two short side surfaces 152, and the bottom surface 153 of the upper case 150 may be a composite layer having the metal layer 150c interposed between the internal layer 150a and the external layer 150b.

The internal layer 150a may form an internal surface of the upper case 150. The internal layer 150a may be positioned at an interior side of the upper case 150 and may be formed using, e.g., a plastic material having chemical resistance against the electrolyte, high ductility, low reactivity to swelling, and/or a high insulating property. In an implementation, the internal layer 150a may be made of or may include, e.g., polypropylene (PP), polyethylene (PE), or the like.

The external layer 150b may form an external surface of the upper case 150. The external layer 150b may be positioned at an exterior side of the upper case 150 and may be formed using, e.g., a plastic material having high scratch resistance and abrasion resistance for the purpose of preventing the upper case 150 from being abraded by external factors or conditions. The external layer 150b may be made of or include, e.g., polyphenylene sulfide (PPS), modified phenylene ether, polyurethane, polycarbonate, polypropylene (PP), or the like.

The metal layer 150c may be interposed between the external layer 150b and the internal layer 150a. The metal layer 150c may be formed by, e.g., depositing a metal in a thin film type through chemical vapor deposition (CVD), physical vapor deposition (PVD), or atomic layer deposition (ALD), spraying a metal in a gel type, or injecting or providing a metal foil or sheet as multiple layers. The metal layer 150c may help improve strength of the upper case 150 by supporting the internal layer 150a and the external layer 150b of the upper case 150, and may help prevent moisture or gases from moving around, e.g., into or out of the battery pack.

The internal layer 150a and the external layer 150b may be formed using a plastic material, thereby achieving a light weight and a configurational freedom of the upper case 150. In addition, the upper case 150 may have reinforced strength by including the metal layer 150c between the plastic internal layer 150a and the plastic external layer 150b.

The electrode terminals 160 may include a positive electrode terminal 161 (electrically connected to one of the positive electrode tabs 111) and the negative electrode terminal 162 (electrically connected to one of the negative electrode tabs 112). The positive electrode terminal 161 may be electrically connected to the positive electrode tab 111 of the electrode assembly 110 (among the plurality of electrode assemblies 110) that is adjacent to one short side surface 152. The negative electrode terminal 162 may be electrically connected to the negative electrode tab 112 of the electrode assembly 110 (among the plurality of electrode assemblies 110) that is adjacent to the other (e.g., opposite) short side surface 152. The gasket 154 may be interposed between the positive electrode terminal 161 and the upper case 150 and between the negative electrode terminal 162 and the upper case 150 to electrically separate or insulate the metal layer 150c of the upper case 150 from the electrode terminals 160.

Figure 2B:
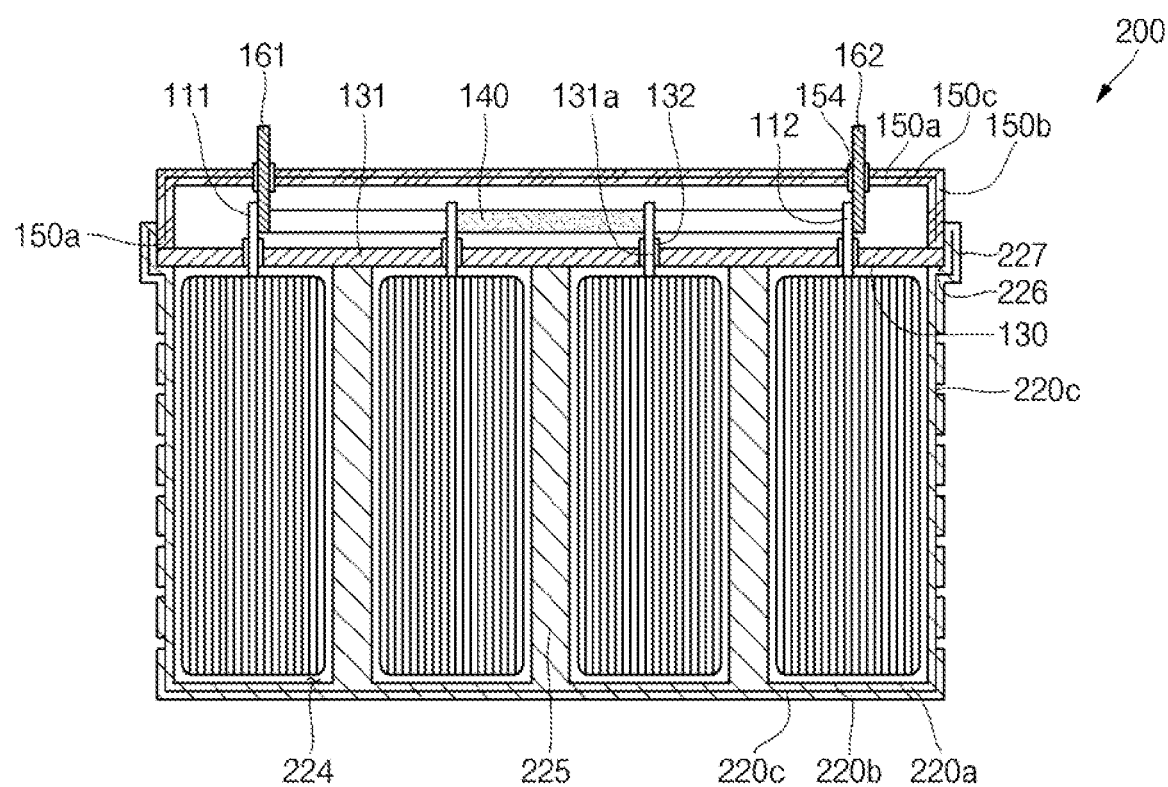

Referring to FIG. 2A, a perspective view and of a battery pack according to another embodiment is illustrated. Referring to FIG. 2B, a cross-sectional view of the battery pack taken along the line 2b-2b of FIG. 2A is illustrated.

As illustrated in FIGS. 2A and 2B, the battery pack 200 according to the present embodiment may include a plurality of electrode assemblies 110, a lower case 220 accommodating the plurality of electrode assemblies 110, a top plate 130 sealing a top opening of the lower case 220, a plurality of connection tabs 140 electrically connecting the plurality of electrode assemblies 110 on a top surface of the top plate 130, an upper case 150 combined or coupled with the lower case 220, and electrode terminals 160 exposed outside and passing through the upper case 150.

The electrode assemblies 110, the top plate 130, the connection tabs 140, the upper case 150, and the electrode terminals 160 of the battery pack 200 are the same as the corresponding functional components of the battery pack 100 illustrated in FIGS. 1A to 1C. Therefore, the battery pack 200 will now be described with regard to the lower case 220, which shows a different feature from the battery pack 100.

The lower case 220 may have a substantially hexahedral or cuboid shape having a top opening to receive the plurality of electrode assemblies 110. The lower case 220 may have two long side surfaces 221 facing each other, two short long side surfaces 222 connecting opposite ends of the two long side surfaces 221, and a rectangular bottom surface 223 connecting bottom sides of the two long side surfaces 221 and the two short side surfaces 222. The two long side surfaces 221, the two short side surfaces 222, and the bottom surface 223 of the lower case 220 may be integrally formed.

A metal layer 220c may be interposed between an internal layer 220a and an external layer 220b of the lower case 220. The internal layer 220a and the external layer 220b may be made of, e.g., a plastic material. For example, each of the two long side surfaces 221, the two short side surfaces 222, and the bottom surface 223 of the lower case 220 may be a composite layer having the metal layer 220c interposed between the internal layer 220a and the external layer 220b.

The internal layer 220a may form the internal surface of the lower case 220. The internal layer 220a may be positioned at an interior side of the lower case 220 and may be formed using, e.g., a plastic material having chemical resistance against the electrolyte and a high insulating property. In an implementation, the internal layer 220a may be made of or include, e.g., polypropylene (PP), polyethylene (PE), or the like.

The external layer 220b may form the external surface of the lower case 220. The external layer 220b may be positioned at an exterior side of the lower case 220 and may be formed using, e.g., a plastic material having high scratch resistance and abrasion resistance for the purpose of helping to prevent the lower case 220 from being abraded by external factors or conditions. The external layer 220b may be made of or include, e.g., polyphenylene sulfide (PPS), modified polyurethane, polycarbonate, polypropylene (PP) or the like. A plurality of through holes 222a may be provided in the external layer 220b of each of the two short side surfaces 222. For example, the metal layer 220c may be exposed to the outside by the plurality of through holes 222a in the external layer 220b. As described above, the metal layer 220c may be partially exposed to the outside, thereby improving heat dissipating performance. In addition, the heat dissipating performance of the metal layer 220c may be improved by the through holes 222a, and distortion of the metal layer 220c may be reduced and/or prevented, thereby preventing a coupling force between the metal layer 220c and the external layer 220b from being undesirably lowered.

The metal layer 220c may be interposed between the external layer 220b and the internal layer 220a. The metal layer 220c may be formed by, e.g., depositing a metal in a thin film type through chemical vapor deposition (CVD), physical vapor deposition (PVD), or atomic layer deposition (ALD), spraying a metal in a gel type, or injecting or providing a metal foil or sheet as multiple layers. The metal layer 220c may help improve strength of the lower case 220 by supporting the internal layer 220a and the external layer 220b of the lower case 220 and may help prevent moisture or gases from moving around, e.g., into or out of the battery pack. In an implementation, the metal layer 220c may be partially exposed to the outside through the plurality of through holes 222a.

The internal layer 220a and the external layer 220b of the lower case 220 may be formed using a plastic material, thereby achieving a light weight and a configurational freedom of the lower case 220. In addition, the lower case 220 may have reinforced strength by including the metal layer 220c between the plastic internal layer 220a and the plastic external layer 220b.

The lower case 220 may be formed by forming the metal layer 220c on the internal surface of the external layer 220b and then forming the internal layer 220a so as to entirely cover the internal surface of the external layer 220b. The external layer 220b and the internal layer 220a may be formed by, e.g., injection molding. The lower case 220 may be configured such that the metal layer 220c may not be exposed at its top end, and the top end may be covered by the external layer 220b.

In addition, the lower case 220 may include the plurality of cell compartments 224 for accommodating the plurality of electrode assemblies 110. For example, the lower case 220 may include a plurality of barriers 225 for separating the internal space of the lower case 220 into the individual cell compartments 224. The barriers 225 may be provided in plural so as to be parallel with the short side surfaces 222 of the lower case 220. The electrode assemblies 110 and an electrolyte may be accommodated in the cell compartments 224. Like the internal layer 220a, the barriers 225 may be made of, e.g., a plastic material having high chemical resistance to the electrolyte and a high insulating property. As illustrated in FIG. 2B, three barriers 225 with four cell compartments 224 may be included, or numbers of barriers 225 and cell compartments 224 may vary according to the number of electrode assemblies 110 accommodated in the lower case 220.

The lower case 220 may further include a stepped portion 226 outwardly bent at a top end thereof. The lower case 220 may also include an extending portion 227 upwardly extending from an end of the stepped portion 226. For example, each of the two long side surfaces 221 and the two short side surfaces 222 of the lower case 220 may include the stepped portion 226 having a top end outwardly bent and extending, and the extending portion 227 upwardly extending from the end of the stepped portion 226. The stepped portion 226 may be a region on which the top plate 130 is placed and coupled. In addition, the extending portion 227 may be a region that surrounds a bottom end of the upper case 150.

By way of summation and review, the multiple series/parallel battery pack may be manufactured by fabricating a secondary battery having an individual electrode assembly sealed in a can, and a plurality of secondary batteries may then be accommodated in a battery pack case. Such a method may increase a manufacturing cost of the case as a number of components may increase, which may lead to an increase in the cost of the multiple series/parallel battery pack.

The embodiments may provide a battery pack, which may be manufactured by accommodating a plurality of electrode assemblies in cell compartments of a case and electrically connecting the plurality of electrode assemblies, thereby minimizing contact resistance between each of the plurality of electrode assemblies and reducing the manufacturing cost and the number of components.

Embodiments may also provide a battery pack, which may achieve lightness in weight by forming upper and lower cases using a plastic material, and which may reinforce mechanical strength of the plastic upper and lower cases by installing a metal layer between internal and external layers of the upper and lower cases.

As described above, the battery pack according to an embodiment may be manufactured by accommodating a plurality of electrode assemblies in cell compartments of a case and electrically connecting the plurality of electrode assemblies, contact resistance between each of the plurality of electrode assemblies may be minimized, and the manufacturing cost and the number of components may be reduced.

In addition, the battery pack according to an embodiment may achieve lightness in weight by forming upper and lower cases using a plastic material. Further, mechanical strength of the plastic upper and lower cases may be reinforced by installing a metal layer between internal and external layers of the upper and lower cases.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:
1. A battery pack, comprising:
a plurality of electrode assemblies,
a lower case including:
a plurality of cell compartments accommodating the plurality of electrode assemblies,
a stepped portion outwardly bent from a side wall of the lower case at a top end thereof, and
an extending portion upwardly extending from an outer edge of the stepped portion, and
an upper case on the lower case at a top opening of the lower case, the upper case extending upwardly from a top end of the extending portion of the lower case,
wherein each of the upper case and the lower case is includes a metal layer interposed between an internal layer and an external layer, the internal layer and the external layer being made of a plastic material,
wherein the plastic material of the internal layer is different from the plastic material of the external layer, and
wherein the extending portion of the lower case surrounds an outer side of a bottom portion of the upper case and is coupled with the upper case.

2. The battery pack as claimed in claim 1, wherein the lower case includes a plurality of barriers separating an internal space of the lower case into the plurality of cell compartments.

3. The battery pack as claimed in claim 2, wherein the barriers are made of a same material as the internal layer.

4. The battery pack as claimed in claim 1, further comprising an electrolyte in the plurality of cell compartments of the lower case.

5. The battery pack as claimed in claim 4, further comprising:
a top plate sealing the top opening of the lower case, and
a plurality of connection tabs electrically connecting electrode tabs of adjacent electrode assemblies, the electrode tabs passing through the top plate.

6. The battery pack as claimed in claim 1, wherein the top plate is placed on a top surface of the stepped portion of the lower case and then sealed with the lower case.

7. The battery pack as claimed in claim 1, further comprising electrode terminals, the electrode terminals:
being exposed outside of the battery pack,
passing through the upper case, and
being electrically connected to the plurality of electrode assemblies,
wherein the electrode terminals are electrically separated from the metal layer of the upper case.

8. The battery pack as claimed in claim 1, wherein the lower case includes a plurality of holes in the external layer thereof, the plurality of holes partially exposing the metal layer at an outside of the battery pack.

9. The battery pack as claimed in claim 1, wherein:
the internal layer includes polypropylene or polyethylene, and
the external layer includes polyphenylene sulfide, modified phenylene ether, polyurethane, or polycarbonate.

* * * * *